United States Patent
Pan et al.

(10) Patent No.: US 12,073,639 B2
(45) Date of Patent: Aug. 27, 2024

(54) IMAGE DESCRIPTION GENERATION METHOD, APPARATUS AND SYSTEM, AND MEDIUM AND ELECTRONIC DEVICE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Yingwei Pan, Beijing (CN); Yehao Li, Beijing (CN); Ting Yao, Beijing (CN); Tao Mei, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 160 days.

(21) Appl. No.: 17/754,601

(22) PCT Filed: Mar. 2, 2021

(86) PCT No.: PCT/CN2021/078673
§ 371 (c)(1),
(2) Date: Apr. 7, 2022

(87) PCT Pub. No.: WO2021/190257
PCT Pub. Date: Sep. 30, 2021

(65) Prior Publication Data
US 2023/0014105 A1    Jan. 19, 2023

(30) Foreign Application Priority Data
Mar. 27, 2020  (CN) .......................... 202010231097.2

(51) Int. Cl.
*G06V 20/70*  (2022.01)
*G06T 7/70*  (2017.01)
(Continued)

(52) U.S. Cl.
CPC ................ *G06V 20/70* (2022.01); *G06T 7/70* (2017.01); *G06V 10/25* (2022.01); *G06V 10/44* (2022.01);
(Continued)

(58) Field of Classification Search
CPC ...... G06V 20/70; G06V 10/82; G06V 10/454; G06V 10/25; G06V 10/44; G06V 10/462;
(Continued)

(56) References Cited

U.S. PATENT DOCUMENTS 6,323,905 B1    11/2001   Kondo et al.
2019/0377979 A1  12/2019  Jiang et al.
(Continued)

FOREIGN PATENT DOCUMENTS

| CN | 107066583 A | 8/2017 |
| CN | 108510012 A | 9/2018 |

(Continued)

OTHER PUBLICATIONS

Chen, Long, et al. "SCA-CNN: Spatial and Channel-Wise Attention in Convolutional Networks for Image Captioning." 2017 IEEE Conference on Computer Vision and Pattern Recognition (CVPR). IEEE, 2017. (Year: 2017).*

(Continued)

*Primary Examiner* — Geoffrey E Summers
(74) *Attorney, Agent, or Firm* — Qinghong Xu

(57) ABSTRACT

The present disclosure relates to the technical field of image processing, and in particular to an image description generation method, apparatus and system, and a medium and an electronic device. The method comprises: acquiring one or (Continued)

more image region features in a target image, and obtaining a current input vector by performing a mean pooling on the image region features; obtaining respective outer product vectors of the image region features by respectively linearly fusing the current input vector and each of the image region features; calculating, based on the respective outer product vectors of the image region features, an attention distribution of the image region features in a spatial dimension and an attention distribution of the image region features in a channel dimension; and generating an image description of the target image based on the attention distribution of the image region features in the spatial dimension and the attention distribution of the image region features in the channel dimension.

18 Claims, 4 Drawing Sheets

(51) Int. Cl.
*G06V 10/25* (2022.01)
*G06V 10/44* (2022.01)
*G06V 10/46* (2022.01)
*G06V 10/80* (2022.01)

(52) U.S. Cl.
CPC .......... *G06V 10/462* (2022.01); *G06V 10/806* (2022.01); *G06V 2201/07* (2022.01)

(58) Field of Classification Search
CPC ............. G06V 10/806; G06V 2201/07; G06N 3/02–0985; G06T 7/70
See application file for complete search history.

(56) References Cited

U.S. PATENT DOCUMENTS

| | | | | |
|---|---|---|---|---|
| 2020/0057805 | A1* | 2/2020 | Lu | G06N 3/082 |
| 2020/0117951 | A1* | 4/2020 | Li | G06F 18/217 |
| 2020/0175053 | A1* | 6/2020 | Zheng | G06N 5/046 |

FOREIGN PATENT DOCUMENTS

| | | |
|---|---|---|
| CN | 109101948 A | 12/2018 |
| CN | 109543699 A | 3/2019 |
| CN | 110458165 A | 11/2019 |
| CN | 110458282 A | 11/2019 |
| CN | 110472642 A | 11/2019 |
| CN | 110490254 A | 11/2019 |
| CN | 110555337 A | 12/2019 |
| CN | 110598713 A | 12/2019 |
| CN | 110674850 A | 1/2020 |
| CN | 111753825 A | 10/2020 |
| EP | 3611663 A1 | 2/2020 |
| JP | 2016506260 A | 3/2016 |

OTHER PUBLICATIONS

Lin, Tsung-Yu, Aruni RoyChowdhury, and Subhransu Maji. "Bilinear CNN Models for Fine-Grained Visual Recognition." 2015 IEEE International Conference on Computer Vision (ICCV). IEEE, 2015. (Year: 2015).*
Kim, Jin-Hwa, Jaehyun Jun, and Byoung-Tak Zhang. "Bilinear attention networks." Advances in neural information processing systems 31 (2018). (Year: 2018).*
The International Search Report dated May 21, 2021 for PCT international application No. PCT/CN2021/078673.
Extended European Search Report dated Aug. 3, 2023 of European Application No. 21775042.1.
Kelvin Xu et al: Show, Attend and Tell-Neural Image Caption Generation with Visual Attention, Apr. 19, 2016.
Lin Tsung-Yu et al: Bilinear CNN Models for Fine-Grained Visual Recognition, Dec. 7, 2015, p. 1449-1457.
Akira Fukui et al: Multimodal Compact Bilinear Pooling for Visual Question Answering and Visual Grounding, Jun. 6, 2016.
Paul-louis prove: Squeeze-and-Excitation Networks. Setting a new state of the art on imageNet. Towards Date Science, Oct. 17, 2017.
Xue Wei et al: Image caption method based on visual attention mechanism.
1st Office Action dated Aug. 5, 2023 of Chinese Application No. 202010231097.2.
Notice of Reasons for Refusal dated Feb. 14, 2023 of Japanese Application No. 2022-517943.
Tao Dai et al., Second-Order Attention Network for Single Image Super-Resolution, 2019 IEEE/CVF Conference on Computer Vision and Pattern Recognition (CVPR), Published on Jan. 9, 2020.
2nd Office Action dated Apr. 27, 2024 for Chinese Application No. 202010231097.2.

* cited by examiner

IMAGE DESCRIPTION GENERATION METHOD, APPARATUS AND SYSTEM, AND MEDIUM AND ELECTRONIC DEVICE

CROSS-REFERENCE TO RELATED APPLICATIONS

The present disclosure is the U.S. national phase application of International Application No. PCT/CN2021/078673, filed on Mar. 2, 2021, which is based on and claims priority to Chinese Patent Application No. 202010231097.2, filed with the Chinese Patent Office on Mar. 27, 2020, titled "IMAGE DESCRIPTION GENERATION METHOD, APPARATUS, SYSTEM, MEDIUM AND ELECTRONIC DEVICE", which are incorporated herein by reference in their entireties for all purposes.

TECHNICAL FIELD

The present disclosure relates to the technology field of image processing, and in particular to an image description generation method, an image description generation apparatus, an image description generation system, a computer-readable storage medium, and an electronic device.

BACKGROUND

With the development of image recognition technology, content information of an image can be converted into a text description of the image by using an algorithm. The task of automatic image description generation aims to give machines an ability to read and speak like a human, that is, to have a deep understanding of the content information of the image and automatically generate description sentences related to the content information.

In the existing image description schemes, an image-level feature aggregation is achieved by firstly finding most relevant region features after encoding in the image based on the state of a decoder, and then assigning different attention weights to each of encoded image region features. The aggregated image-level feature can be passed into the decoder to guide the decoding process of the description text.

However, the above scheme has the following defects: the traditional attention module usually uses single linear fusion to perform cross-modal feature interaction learning, which essentially only mines a first-order feature interaction between different modalities, so it will make the generated image description has lower accuracy.

Therefore, it is necessary to provide a new image description generation method and apparatus.

It should be noted that the information disclosed in the above background section is only for enhancement of understanding of the background of the present disclosure, and therefore may contain information that does not form the prior art that is already known to a person of ordinary skill in the art.

SUMMARY

According to an aspect of the embodiments of the present disclosure, there is provided an image description generation method. The image description generation method may include: acquiring one or more image region features in a target image, and obtaining a current input vector by performing a mean pooling on the image region features; obtaining respective outer product vectors of the image region features by respectively linearly fusing the current input vector and each of the image region features; calculating, based on the respective outer product vectors of the image region features, an attention distribution of the image region features in a spatial dimension and an attention distribution of the image region features in a channel dimension; and generating an image description of the target image based on the attention distribution of the image region features in the spatial dimension and the attention distribution of the image region features in the channel dimension.

According to an aspect of the embodiments of the present disclosure, a non-transitory computer-readable storage medium is provided. A computer program is stored on the computer-readable storage medium, when the computer program is executed by a processor, an image description generation method according to embodiments mentioned above is implemented.

According to an aspect of the embodiments of the present disclosure, an electronic device is provided. The electronic device includes: a processor; and memory for storing instructions executed by the processor; wherein, the processor is configured to acquire one or more image region features in a target image, and obtain a current input vector by performing a mean pooling on the image region features; obtain respective outer product vectors of the image region features by respectively linearly fusing the current input vector and each of the image region features; calculate, based on the respective outer product vectors of the image region features, an attention distribution of the image region features in a spatial dimension and an attention distribution of the image region features in a channel dimension; and generate an image description of the target image based on the attention distribution of the image region features in the spatial dimension and the attention distribution of the image region features in the channel dimension.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. Obviously, the drawings in the following description are only some embodiments of the present disclosure, and for those of ordinary skill in the art, other drawings can also be obtained from these drawings without creative efforts.

DETAILED DESCRIPTION

Figure 1:
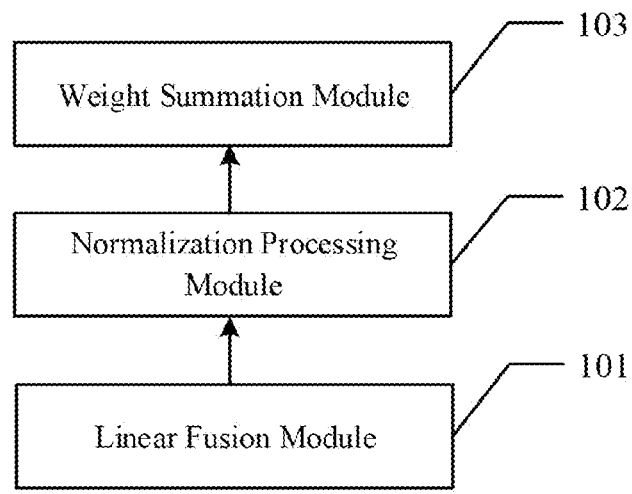
FIG. 1 schematically shows a block diagram of an attention model according to some embodiments of the present disclosure.

Example embodiments will now be described more fully with reference to the accompanying drawings. Example embodiments, however, can be embodied in various forms and should not be construed as limited to examples set forth herein; rather, these embodiments are provided so that this disclosure will be thorough and complete, and will fully convey the concept of example embodiments to those skilled in the art. The described features, structures, or characteristics may be combined in any suitable manner in one or more embodiments. In the following description, numerous specific details are provided in order to give a thorough understanding of the embodiments of the present disclosure. However, those skilled in the art will appreciate that the technical solutions of the present disclosure may be practiced without one or more of the specific details, or other methods, components, apparatus, steps, etc. may be employed. In other instances, well-known solutions have not been shown or described in detail to avoid obscuring aspects of the present disclosure.

Furthermore, the drawings are merely schematic illustrations of the present disclosure and are not necessarily drawn to scale. The same reference numerals in the drawings denote the same or similar parts, and thus their repeated descriptions will be omitted. Some of the block diagrams shown in the figures are functional entities that do not necessarily correspond to physically or logically separate entities. These functional entities may be implemented in software, or in one or more hardware modules or integrated circuits, or in different networks and/or processor devices and/or microcontroller devices.

The task of automatic image description generation aims to give machines the ability to read and speak like a human, that is, to have a deep understanding of image content and automatically generate description sentences related to the image content. This research task covers two major directions of computer vision and natural language processing, and is also an important topic of cross-modal interactive learning in the field of artificial intelligence.

The current mainstream image description generation models all follow the "encoder-decoder" design concept. That is, first using a convolutional neural network to encode an input image, and then using a recurrent neural network to decode description sentences. However, because this general design concept ignores feature interactions between different modalities, it is far from being able to generate high-quality description sentences simply by using this design concept to build a system.

In order to make up for such defects, in recent years, the industry has begun to focus on an attention mechanism, which can realize feature interactions between different modalities in the encoder-decoder design framework. Specifically, the attention mechanism can learn how to find most relevant region features after encoding in the image based on a state of the decoder, and then achieve an aggregation of image-level features by assigning different attention weights to each encoded image region feature. The aggregated image-level features can be passed into the decoder to guide the decoding process of the description text.

The specific structure of the traditional attention module is shown in FIG. 1. Referring to FIG. 1, the traditional attention module may include a linear fusion module 101, a normalization processing module 102 and a weight summation module 103. Specifically, firstly, an input conditional feature Q (that is, a current hidden state feature of a decoder) and a local key expression K (that is, each encoded image region feature) both coming from different modalities are linearly fused through a linear fusion module 101, so as to obtain attention weights corresponding to each image region; secondly, the attention weights are processed through a normalization processing module and each of the normalized attention weights is applied to a corresponding local feature V (i.e., encoded image region feature), and finally, image region features with weights are added together to obtain an image-level aggregated feature. By using this attention model, it can be seen that the final image-level aggregated feature is a product after an interaction between two different modal features, i.e., visual information (encoded image region features) and textual information (decoder hidden state features).

However, traditional attention modules usually use linear fusion for cross-modal feature interaction learning, so in essence, only the first-order feature interactions between different modalities are mined, which greatly limits the role of image content inference task of the attention module in this complex cross-modality.

Figure 2:
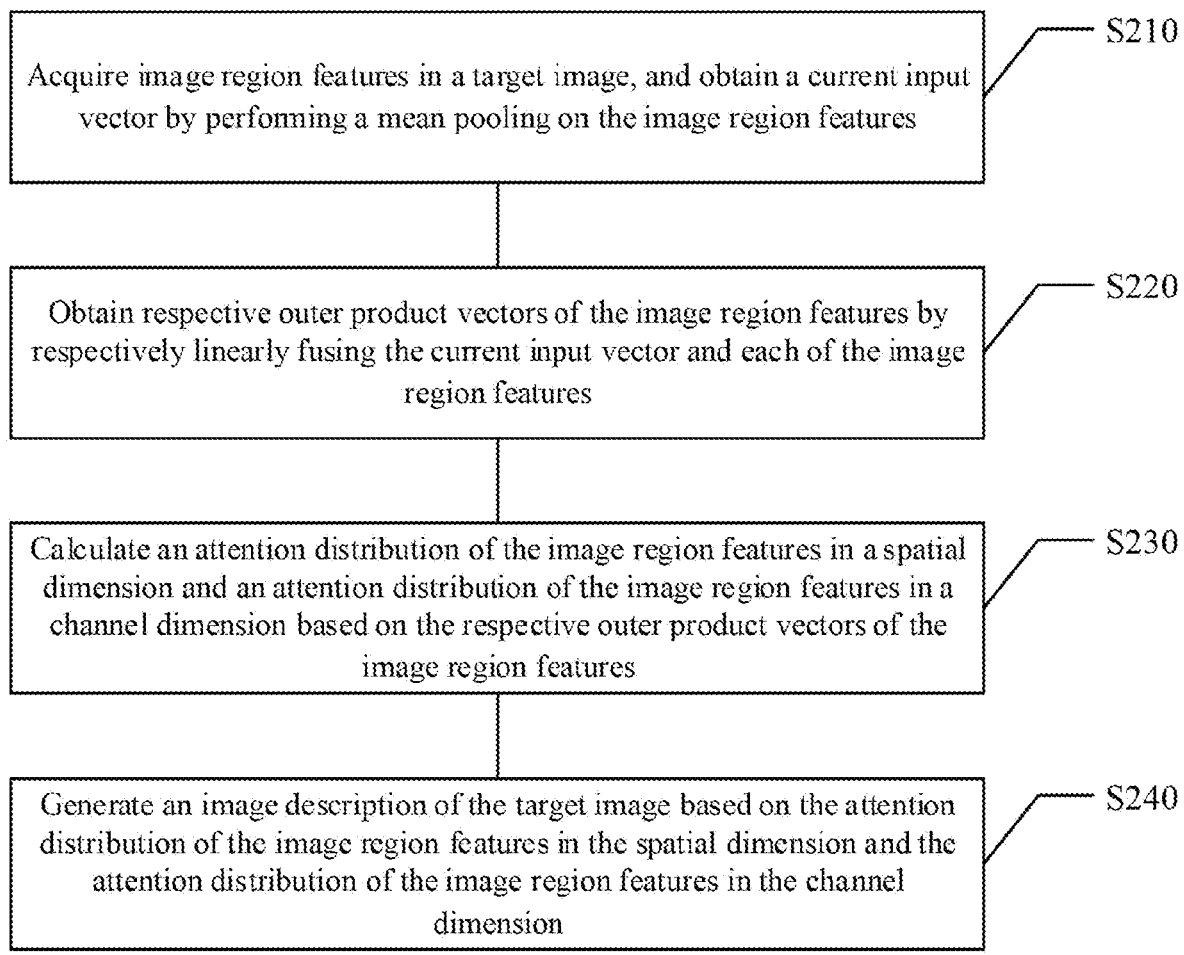
FIG. 2 schematically shows a flowchart of an image description generation method according to some embodiments of the present disclosure.

In the embodiments of the present disclosure, an image description generation method is provided firstly, which can run on a server, server cluster, or cloud server, etc. Of course, those skilled in the art can also run the method of the present disclosure on other platforms as required. This is not specifically limited in the exemplary embodiment. Referring to FIG. 2, the image description generation method may include the following steps S210-S240.

At step S210, one or more image region features in a target image are acquired, and a current input vector is obtained by performing a mean pooling on the image region features. At step S220, respective outer product vectors of the image region features are obtained by respectively linearly fusing the current input vector and each of the image region features. At step S230, an attention distribution of the image region features in a spatial dimension and an attention distribution of the image region features in a channel dimension are calculated based on the respective outer product vectors of the image region features. At step S240, an image description of the target image is generated based on the attention distribution in the spatial dimension and the attention distribution in the channel dimension.

In the above image description generation method, on the one hand, by obtaining the current input vector via performing a mean pooling on the image region features; obtaining the respective outer product vectors of the image region features via linearly fusing the current input vector and the image region features; calculating the attention distribution of the image region feature in the spatial dimension and the attention distribution in the channel dimension based on the respective outer product vectors of the image region features; and finally, generating the image description of the target image based on the attention distribution in the spatial dimension and the attention distribution in the channel dimension, the following problems are solved, in the prior art, since the traditional attention module usually uses linear fusion to perform the cross-modal feature interaction learning, it essentially only mines the first-order feature interaction between different modalities, so it results in low accuracy of the generated image description. Furthermore, by using the image description generation method provided by embodiments of the present disclosure, the accuracy of the generated image description is improved. On the other hand, by generating the image description of the target image according to the attention distribution in the spatial dimension and the attention distribution in the channel dimension, it realizes generating the image description of the target image according to attention distributions on two dimensions.

Hereinafter, each step in the image description generation method of some embodiments of the present disclosure will be explained and described in detail with reference to the accompanying drawings.

First, the purpose of the some embodiments of the present disclosure is explained and illustrated. Specifically, in this disclosure, how to apply a high-order attention model to the task of automatic image description generation are mainly studied. Because in the image description generation system based on "encoder-decoder", the attention mechanism is usually involved in two places. One is that the attention mechanism can be introduced between various regions in the image in the encoder for encoding, and the other is the attention mechanism is used between the encoder and the decoder to carry out cross-modal information interaction. Therefore, the present disclosure attempts to add the designed high-order attention model in these two places to improve the intra-encoding performance of the single-modal and interactive learning ability of features between multi-modal, which ultimately enhances the quality of the generated description.

Next, the image description generation system involved in some embodiments of the present disclosure is explained and explained.

Figure 3:
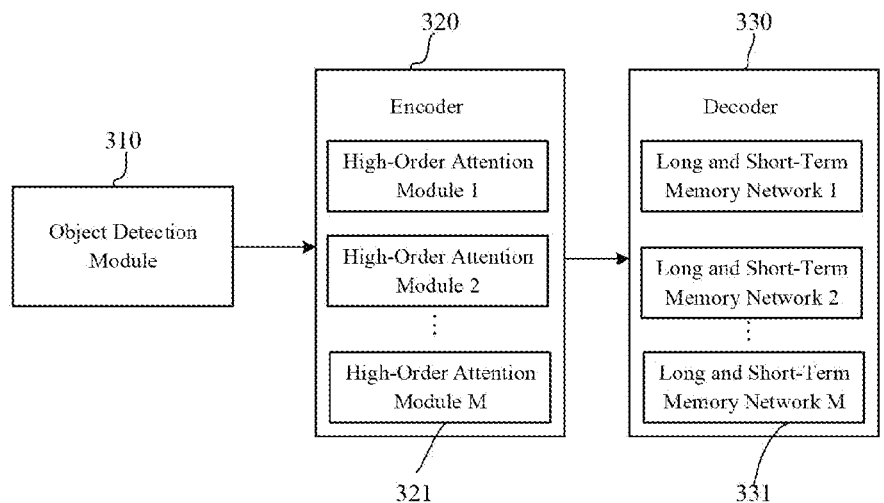
FIG. 3 schematically shows a block diagram of an image description generation system according to some embodiments of the present disclosure.

Referring to FIG. 3, the image description generation system may include an object detection module 310, an encoder 320 and a decoder 330.

The object detection module 310 can be used to obtain one or more image region features in a target image. The object detection module 310 can be, for example, a Faster R-CNN.

The encoder 320 is connected to the object detection module 310 via the network, and includes a plurality of high-order attention modules 321 (such as a high-order attention module 1, a high-order attention module 2, . . . , a high-order attention module M). Each of the high-order attention modules 321 may include a high-order linear attention module (X-Linear Attention), a mapping layer (Embed), and a normalization module (Add & Norm).

A decoder 330 is connected to the encoder 320 via the network, and includes a plurality of long and short-term memory networks 331 with a high-order attention mechanism (a long and short-term memory network 1, a long and short-term memory network 2, . . . , a long and short-term memory network M). Each of the long and short-term memory networks 331, which having a high-order attention mechanism, may include a high-order linear attention module (X-Linear Attention), a mapping layer (Embed), a gate linear structure (GLU), a single linearization module (Linear) and a classification module (Softmax).

In some embodiments, the plurality of high-order attention modules 321 are configured to obtain a current input vector by performing a mean pooling process on image region features; obtain respective outer product vectors of the image region features by performing a linear fusion on the current input vector and each of the image region features, respectively; and calculate an attention distribution of the image region features on a spatial dimension and an attention distribution of the image region features on a channel dimension based on the respective outer product vectors of the image region features.

The plurality of long and short-term memory networks with the high-order attention mechanism are used to generate the image description of the target image based on the attention distribution of the image region features in the spatial dimension and the attention distribution of the image region features in the channel dimension.

Hereinafter, steps S210 to S240 will be explained and described in conjunction with the above-mentioned image description generation system.

At step S210, the image region features in the target image are acquired and the current input vector is obtained by performing the mean pooling on the image region features.

In some embodiments, firstly, the target image is detected to obtain one or more objects included in the target image and image region features corresponding to each of the objects; then the mean pooling process is performed on the image region features to get the current input vector.

In some embodiments, as shown in FIG. 3, first of all, for the input image, the object detection module 310 (that is, the Faster R-CNN) first detects one or more objects included in the image, and obtains the image region features corresponding to each object. After detecting, all image region features are passed into (1+M) superimposed high-order attention modules 321, and then a mean pooling is performed on all image region features to obtain the mean pooling vector (that is, the current input vector, denoted by Q).

At step S220, the respective outer product vectors of the image region features are obtained linearly fusing the current input vector and each of the image region features.

In this exemplary embodiment, after obtaining the above-mentioned current input vector Q, the high-order linear attention module (X-Linear Attention) can be used to respectively linearly fuse the current input vector Q and each of the image region features (K) to obtain the respective outer product vectors of the image region features. Specifically, an exponential mapping may be performed on both of the current input vector and each of the image region features, and the exponential mapped current input vector and the exponential mapped image region feature after the exponential mapping process (i.e., the exponential mapped current input vector and the exponential mapped image region features) may be linearly fused to obtain the respective outer product vectors of the image region features. The respective outer product vectors of the image region features includes second-order feature interaction information between current hidden state features of the decoder and the encoded image region features. It should be added that the linear fusion here can be bilinear fusion or multi-linear fusion, which is not limited in this example.

It should be added that this high-order attention model can also realize the mining of second-order feature interaction information and higher-order feature interaction information by way of simple stacking. In the stacking operation of the high-order attention model, a query expression input by the high-order attention model of each layer is set as the image-level aggregated feature output by the high-order attention model of a previous layer, and a local key expression K and a local feature V (wherein, K and V are both of the above-mentioned image region features) input by the high-order attention model of each layer are set as region features mapped after jointing the K and the V input by the previous layer and the image-level aggregated features output from the previous layer together. Considering that continuous stacking will bring multiplied network parameters, a design that can be extended to infinite-order feature interaction is also proposed herein. That is, adding an exponential linear unit (ELU) to the previously designed high-order attention model, and then exponentially mapping the current input vector and the image region features through the exponential linear unit.

In some embodiments, by exponentially mapping the current input vector and image region features, and then performing a bilinear fusion consistent with the high-order attention model and an aggregation processing based on attention weights on the spatial dimension and the channel dimension, the final image-level aggregated features contain infinite-order feature interaction information between different modalities, so that it can be extended to infinite-order designs without introducing additional network parameters. Furthermore, cross-modal infinite-order interactive learning can also be carried out in case that the network parameters are not changed.

At step S230, the attention distribution of the image region features in the spatial dimension and the attention distribution of the image region features in the channel dimension are calculated based on the respective outer product vectors of the image region features.

Figure 4:
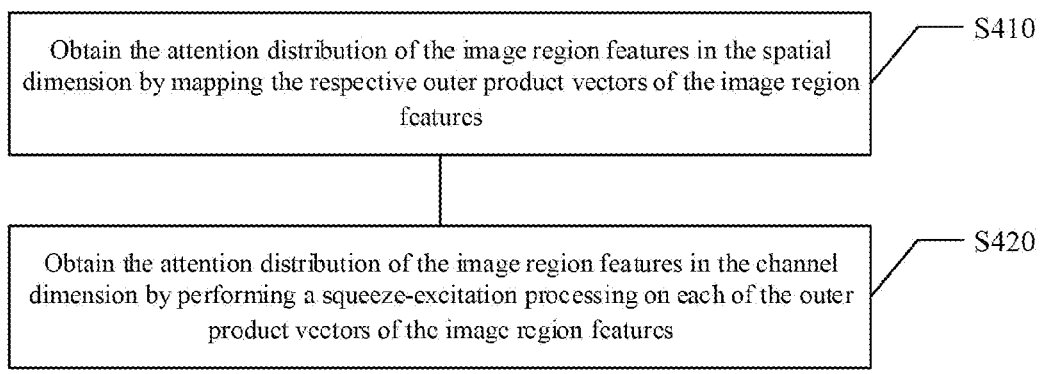
FIG. 4 schematically shows a flowchart of a method for calculating an attention distribution of image region features in a spatial dimension and an attention distribution in a channel dimension based on respective outer product vectors of the image region features according to some embodiments of the present disclosure.

In some embodiments, referring to FIG. 4, the step of calculating the attention distribution of the image region features in the spatial dimension and the attention distribution of the image region features in the image region features in the channel dimension based on the respective outer product vectors of the image region features may include step S410 and step S420.

At step S410, the attention distribution of the image region features in the spatial dimension is obtained by mapping the respective outer product vectors of the image region features.

In this embodiment, firstly, the respective outer product vectors of the image region features are mapped to obtain an attention weight corresponding to each image region included in the image region features; and secondly, the attention weight corresponding to each image region included in the image region features is normalized to obtain the attention distribution of the image region features in the spatial dimension.

In some embodiments, the respective outer product vectors of the image region features can be passed through two vector mapping layers (Embed) to obtain the attention weight corresponding to each image region; and then, normalization is additionally performed on all attention weights by using Softmax, so as to obtain the attention distribution in the spatial dimension.

At step S420, the attention distribution of the image region features in the channel dimension is obtained by performing a squeeze-excitation processing on respective the outer product vectors of the image region features.

In this embodiment, firstly, each of the outer product vectors of the image region features is fused in the spatial dimension to obtain a squeezed channel expression; secondly, a excitation processing is performed on the squeezed channel expression to obtain the attention weight of the image region features in the channel dimension; finally, a regularization processing is performed on the attention weight of the image region features in each channel dimension to obtain the attention distribution of the image region features in the channel dimension.

In some embodiments, a Squeeze-Excitation layer can additionally act on the outer product vector representation passed through one mapping layer (Embed), in order to obtain the attention distribution in the feature channel dimension. Among them, the specific process is to perform a squeeze operation on all image region features and the respective outer product vectors after the decoder hidden state feature mapping, i.e., performing the squeezing and fusion in the spatial dimension, so as to obtain a squeezed channel expression. Then an excitation operation is performed on the squeezed channel expression to obtain the attention distribution in the channel dimension. Further, regarding to the attention distribution in the channel dimension herein, a regularization processing is also performed on the attention weight corresponding to each channel by using Sigmoid, so as to obtain the final attention weight in the channel dimension.

At step S240, an image description of the target image is generated based on the attention distribution of the image region features in the spatial dimension and the attention distribution of the image region features in the channel dimension.

Figure 5:
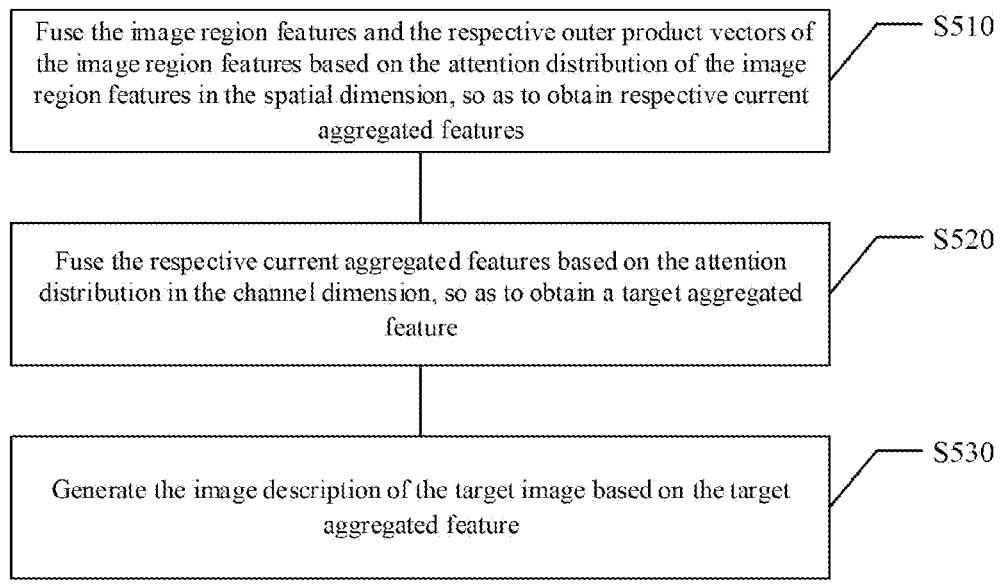
FIG. 5 schematically shows a flowchart of a method for generating an image description of a target image based on an attention distribution of image region features in a spatial dimension and an attention distribution of image region features in a channel dimension according to some embodiments of the present disclosure.

In this embodiment, referring to FIG. 5, the step of generating the image description of the target image based on the attention distribution of the image region features in the spatial dimension and the attention distribution of the image region features in the channel dimension may include steps S510 to S530.

At step S510, the image region features and the respective outer product vectors of the image region features are fused based on the attention distribution of the image region features in the spatial dimension, so as to obtain respective current aggregated features. At step S520, the respective current aggregated features are fused based on the attention distribution in the channel dimension, so as to obtain a target aggregated feature. At step S530, the image description of the target image is generated based on the target aggregated feature.

Hereinafter, steps S510 to S530 will be explained and described. First, after obtaining the two attention distributions in the spatial dimension and the channel dimension, all image region features and the respective outer product vectors after mapping the hidden state features of the decoder will first be fused according to the attention distribution in the spatial dimension, so as to obtain the respective current aggregated features; and then the respective current aggregated features are fused according to the attention distribution in the channel dimension, so as to obtain the final outputted image-level aggregated feature (i.e., the target aggregated feature).

The present disclosure creates a new high-order attention model, so that it can mine deeper into second-order or even higher-order feature interactions between different modalities, so as to enhance cross-modal content understanding. This high-order attention model specifically uses bilinear fusion in both of the spatial dimension and the channel dimension of features at the same time, in order to learn second-order feature interactions between different modalities. Higher-order feature interactions can then be mined down through modular stacking operations. In addition, the introduction of exponential linear units in higher-order attention models can explore infinite-order feature interactions among different modalities. Finally, this high-order attention model can be used as a flexible plug-in component to interface to the current popular image description automatic generation model, which greatly improves the feature interaction ability of encoder and decoder in the image description generation model within modalities and across modalities and enhances the accuracy of this cross-modal generation task.

Hereinafter, the image description generation method involved in the some embodiments of the present disclosure will be further explained and described with reference to FIG. 6.

Figure 6:
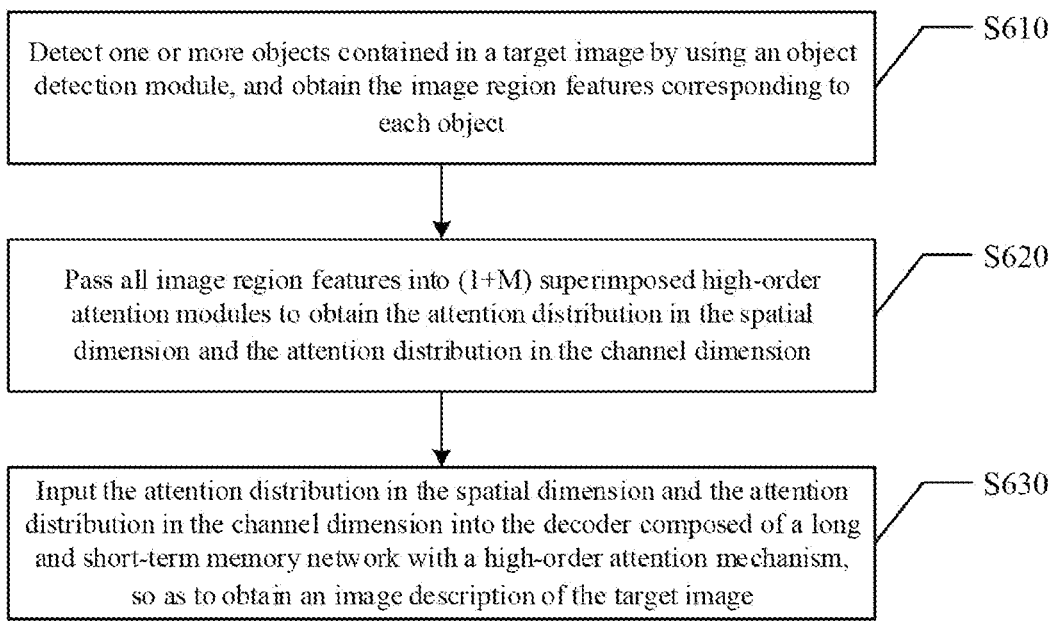
FIG. 6 schematically shows a flowchart of another image description generation method according to some embodiments of the present disclosure.

First, as shown in FIG. 6, the image description generation method may include the following steps S610-S630:

At step S610, one or more objects contained in a target image are detected by using an object detection module (i.e., Faster R-CNN), and the image region features corresponding to each object are obtained.

At step S620, all image region features are passed into (1+M) superimposed high-order attention modules to obtain the attention distribution in the spatial dimension and the attention distribution in the channel dimension. For a first high-order attention model in the encoder, the input query expression Q is the mean pooling vector of all image region features, and the local key expression K and local feature V are both set as image region features; the following M high-order attention modules are all sequentially stacked on top of the first high-order attention module.

Therefore, through the function of the encoder composed of the superposition of high-order attention modules, the high-order feature interaction information between the two regions is incorporated into the final output image region features, so that they can better express the visual information contained in each image region. At the same time, these (1+M) high-order attention modules also output (1+M) image-level aggregated features, and these encoded image region features and image-level aggregated features will be input into the decoder to generate a description text.

At step S630, the attention distribution in the spatial dimension and the attention distribution in the channel dimension are input into the decoder composed of a long and short-term memory network (LSTM) with a high-order attention mechanism, so as to obtain an image description of the target image. Among them, long and short-term memory networks are used to model the contextual relationship between words and words.

In some embodiments, at each decoding moment, inputs of the long and short-term memory network are composed of four kinds of information: a current input word vector, a hidden state of the long and short-term memory network at a previous moment, and a context information vector output at the previous moment, and an image-level feature representation (which is a concatenation of image-level aggregated features and mean pooling vectors output by all encoders). After the long and short-term memory network outputs the current hidden state vector, it is passed, as the input query expression Q, into a high-order attention model, and at the same time the encoded image region features are also input, as the local key expression K and the local feature V, into the high-order attention model.

In this way, the image-level aggregated features output by the high-order attention model in the decoder can well mine the high-order feature interaction information between different modalities, and the output image-level aggregated features will pass through one mapping layer, concatenate with the current hidden state, and then input into a gate linear structure (GLU) to form a context information vector output at the current moment. The context information vector has two purposes, one is as an input of the long and short-term memory network at a next moment, and the other is to obtain a word probability distribution predicted at a current moment through a classification layer (Softmax). In this way, the decoding process will continue until the paragraph break of the final description text is predicted and then the decoding process is stopped.

Therefore, for such an image description generation system with the high-order attention model, the high-order attention model inserted in the encoder and decoder respectively enhances the high-order information interaction between the regional features within the single modality, such as the image, as well as the high-order feature information interaction between different modalities such as image and description text, thus promoting the ability of cross-modal image content reasoning while improving the coding feature and, so that the final generated description text can more accurately express the visual content included in the image.

The image description generation method provided by the some embodiments of the present disclosure creatively designs the high-order attention model. In addition, the pioneering work of incorporating this high-order attention model into the process of image description generation enhances the generation quality from image visual information to text description.

Figure 7:
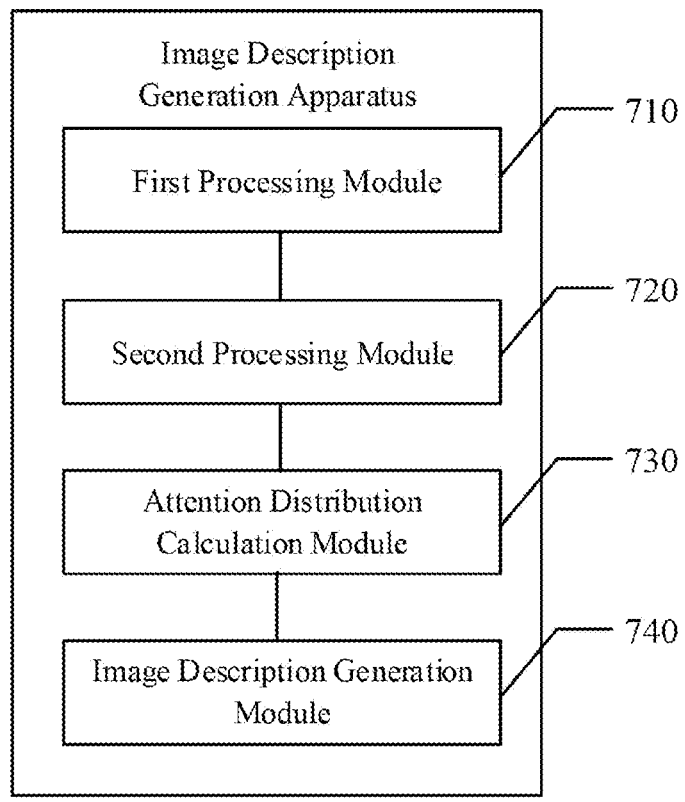
FIG. 7 schematically shows a block diagram of an image description generation apparatus according to some embodiments of the present disclosure.

Some embodiments of the disclosure also provide an image description generation apparatus. Referring to FIG. 7, the image description generation apparatus includes a first processing module 710, a second processing module 720, an attention distribution calculation module 730 and an image description generation module 740.

The first processing module 710 may be configured to acquire one or more image region features in a target image, and obtain a current input vector by performing a mean pooling on the image region features.

The second processing module 720 may be configured to obtain respective outer product vectors of the image region features by respectively linearly fusing the current input vector and each of the image region features.

The attention distribution calculation module 730 may be configured to calculate, based on the respective outer product vectors of the image region features, an attention distribution of the image region features in a spatial dimension and an attention distribution of the image region features in a channel dimension.

The image description generation module 740 may be configured to generate an image description of the target image based on the attention distribution of the image region features in the spatial dimension and the attention distribution of the image region features in the channel dimension.

In some embodiments of the present disclosure, the acquiring image region features in the target image includes: obtaining at least one object included in the target image and the image region features corresponding to each object and by detecting the target image.

In some embodiments of the present disclosure, the calculating, based on the respective outer product vectors of the image region features, the attention distribution of the image region features in the spatial dimension and the attention distribution of the image region features in the channel dimension includes: obtaining the attention distribution of the image region features in the spatial dimension by mapping the respective outer product vectors of the image region features; and obtaining the attention distribution of the image region features in the channel dimension by performing a squeeze-excitation processing on the respective outer product vectors of the image region features.

In some embodiments of the disclosure, the obtaining the attention distribution of the image region features in the spatial dimension by mapping the respective outer product vectors of the image region features includes: obtaining an attention weight corresponding to each image region by mapping each of the outer product vectors of the image region features; and obtaining the attention distribution of the image region features in the spatial dimension by normalizing the attention weight corresponding to each image region.

In some embodiments of the present disclosure, the obtaining the attention distribution of the image region features in the channel dimension by performing the squeeze-excitation processing on the respective outer product vectors of the image region features includes: obtaining a squeezed channel expression by fusing each of the outer product vectors of the image region features in the spatial dimension; obtaining the attention weight of the image region features in the channel dimension by performing an excitation processing on the squeezed channel expression; and obtaining the attention distribution of the image region features in the channel dimension by performing a regularization processing on the attention weight of the image region features in each channel dimension.

In some embodiments of the present disclosure, the generating an image description of the target image based on the attention distribution in the spatial dimension and the attention distribution in the channel dimension includes: obtaining respective current aggregated features by fusing, based on the attention distribution of the image region features in the spatial dimension, the image region features and the respective outer product vectors of the image region features; obtaining a target aggregated feature by fusing the respective current aggregated features based on the attention distribution of the image region features in the channel dimension; and generating the image description of the target image based on the target aggregated feature.

In some embodiments of the present disclosure, the obtaining respective outer product vectors of the image region features by linearly fusing the current input vector and the image region features includes: obtaining the respective outer product vectors of the image region features by respectively performing an exponential mapping on the current input vector and each of the image region features, and performing a linear fusion on the exponential mapped current input vector and the exponential mapped image region feature.

In some embodiments of the present disclosure, the respective outer product vectors of the image region features comprises second-order feature interactive information between a current hidden state feature of a decoder and an encoded image region feature.

The specific details of each module in the above image description generation apparatus have been described in detail in the corresponding image description generation method, so they will not be repeated here.

It should be noted that although several modules or units of the apparatus for action performance are mentioned in the above detailed description, this division is not mandatory. Indeed, according to embodiments of the present disclosure, the features and functions of two or more modules or units described above may be embodied in one module or unit. Conversely, the features and functions of one module or unit described above may be further divided into multiple modules or units to be embodied.

Additionally, although the various steps of the methods of the present disclosure are depicted in the figures in a particular order, this does not require or imply that the steps must be performed in the particular order or that all illustrated steps must be performed to achieve the desired result. Additionally or alternatively, certain steps may be omitted, multiple steps may be combined into one step for execution, and/or one step may be decomposed into multiple steps for execution, and the like.

In some embodiments of the present disclosure, an electronic device capable of implementing the above method is also provided.

As will be appreciated by one skilled in the art, various aspects of the present disclosure may be implemented as a system, method or program product. Therefore, various aspects of the present disclosure can be embodied in the following forms: a complete hardware implementation, a complete software implementation (including firmware, microcode, etc.), or a combination of hardware and software aspects, which may be collectively referred to herein as implementations 'circuit', 'module' or 'system'.

An electronic device 800 according to some embodiments of the present disclosure is described below with reference to FIG. 8. The electronic device 800 shown in FIG. 8 is only an example, and should not impose any limitation on the function and scope of use of the embodiments of the present disclosure.

Figure 8:
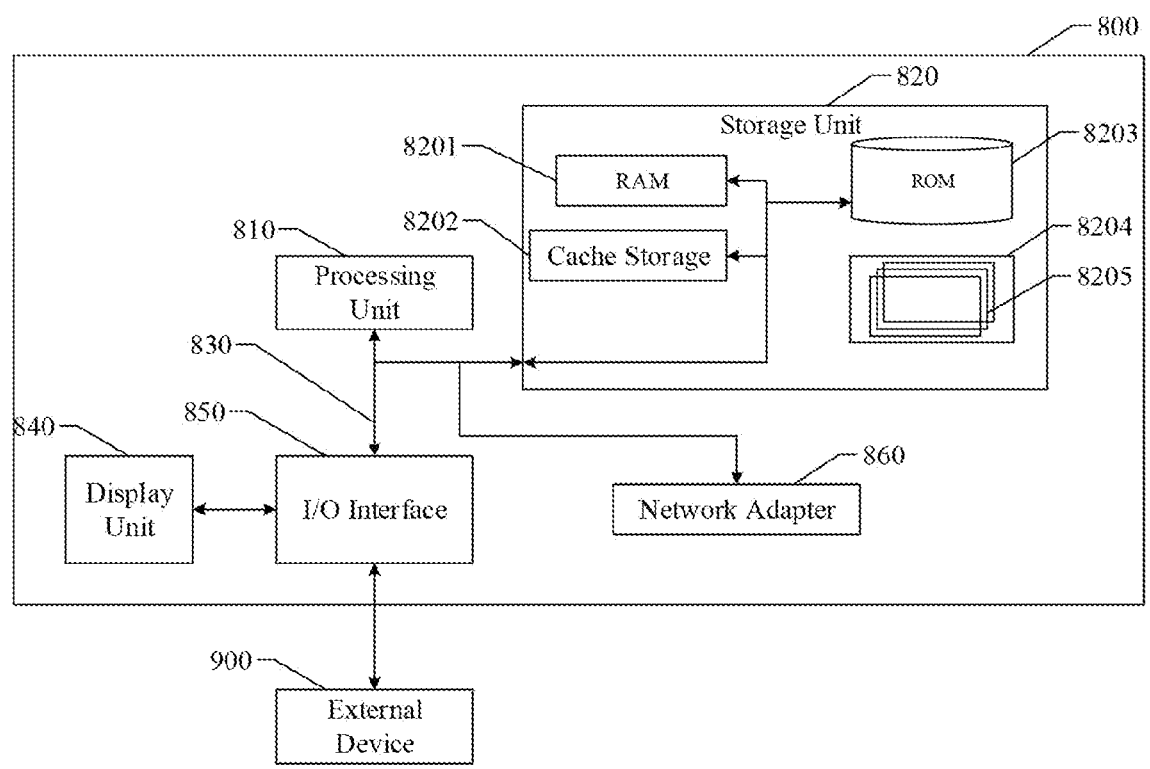
FIG. 8 schematically shows an electronic device for implementing the above image description generation method according to some embodiments of the present disclosure.

As shown in FIG. 8, the electronic device 800 takes the form of a general-purpose computing device. Components of the electronic device 800 may include, but are not limited to, the above-mentioned at least one processing unit 810, the above-mentioned at least one storage unit 820, a bus 830 connecting different system components (including storage unit 820 and the processing unit 810), and a display unit 840.

Wherein, the storage unit stores program codes, and the program codes can be executed by the processing unit 810, so that the processing unit 810 executes steps of various methods according to the present disclosure described in the above-mentioned 'Detailed Description' section of this specification. Implementation steps. For example, the processing unit 810 may perform steps as shown in FIG. 2: S210, acquiring one or more image region features in a target image, and obtaining a current input vector by performing a mean pooling on the image region features; step S220, obtaining respective outer product vectors of the image region features by respectively linearly fusing the current input vector and each of the image region features; step S230, calculating, based on the respective outer product vectors of the image region features, an attention distribution of the image region features in a spatial dimension and an attention distribution of the image region features in a channel dimension; and step S240, generating an image description of the target image based on the attention distribution of the image region features in the spatial dimension and the attention distribution of the image region features in the channel dimension.

The storage unit 820 may include a readable medium in the form of a volatile storage unit, such as a random access storage unit (RAM) 8201 and/or a cache storage unit 8202, and may further include a read only storage unit (ROM) 8203.

The storage unit 820 may also include a program/utility 8204 having a set (at least one) of program modules 8205, including, but not limited to, an operating system, one or more application programs, other program modules, and program data. An implementation of a network environment may be included in each or some combination of these examples.

The bus 830 may be representative of one or more of several types of bus structures, including a memory cell bus or a memory cell controller, a peripheral bus, a graphics acceleration port, a processing unit, or a local area bus using any of a variety of bus structures.

The electronic device 800 may communicate with one or more external devices 900 (e.g., keyboards, pointing devices, Bluetooth devices, etc.), and may also communicate with one or more devices that enable a user to interact with the electronic device 800, and/or with any device (e.g., a router, a modem, etc.) that enables the electronic device 800 to communicate with one or more other computing devices. Such communication may take place through input/output (I/O) interface 850. Also, the electronic device 800 may also communicate with one or more networks (e.g., a local area network (LAN), a wide area network (WAN), and/or a public network, such as the Internet) through a network adapter 860. As shown, the network adapter 860 communicates with other modules of electronic device 800 via bus 830. It should be understood that, although not shown, other hardware and/or software modules may be used in conjunction with electronic device 800, including but not limited to: microcode, device drivers, redundant processing units, external disk drive arrays, RAID systems, tape drives and data backup storage systems.

From the description of the above embodiments, those skilled in the art can easily understand that the embodiments described herein may be implemented by software, or may be implemented by software combined with necessary hardware. Therefore, the technical solution according to the embodiments of the present disclosure may be embodied in the form of a software product, and the software product may be stored in a non-volatile storage medium (which may be a CD-ROM, U disk, mobile hard disk, etc.) or on a network, including several instructions to cause a computing device (which may be a personal computer, a server, a terminal device, or a network device, etc.) to execute the method according to embodiments of the present disclosure.

In some embodiments of the present disclosure, there is also provided a computer-readable storage medium on which a program product capable of implementing the above-described method of the present specification is stored. In some possible implementations, various aspects of the present disclosure may also be implemented in the form of a program product comprising program code for causing the program product to run on a terminal device when the program product is run on a terminal device. The terminal device performs the steps according to various embodiments of the present disclosure described in the above-mentioned 'Detailed Description' section of this specification.

A program product for implementing the above method according to embodiments of the present disclosure may adopt a portable compact disc read only memory (CD-ROM) and include program codes, and may run on a terminal device, such as a personal computer. However, the program product of the present disclosure is not limited thereto, and in this document, a readable storage medium may be any tangible medium that contains or stores a program that can be used by or in conjunction with an instruction execution system, apparatus, or device.

The program product may employ any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of readable storage media include: electrical connections with one or more wires, portable disks, hard disks, a random access memory (RAM), a read only memory (ROM), a erasable programmable read only memory (EPROM or flash memory), an optical fiber, a portable compact disk read only memory (CD-ROM), optical storage devices, magnetic storage devices, or any suitable combination of the foregoing.

A computer readable signal medium may include a propagated data signal in baseband or as part of a carrier wave and carry readable program codes. Such propagated data signals may take a variety of forms, including but not limited to electromagnetic signals, optical signals, or any suitable combination of the foregoing. A readable signal medium can also be any readable medium, other than a readable storage medium, that can transmit, propagate, or transport the program for use by or in connection with the instruction execution system, apparatus, or device.

Program code embodied on a readable medium may be transmitted using any suitable medium, including but not limited to wireless, wire, optical fiber cable, RF, etc., or any suitable combination of the foregoing.

Program code for performing the operations of the present disclosure may be written in any combination of one or more programming languages, including object-oriented programming languages, such as Java, C++, etc., as well as conventional procedural Programming Language, such as the C language or similar programming language. The program code may execute entirely on the user's computing device, partly on the user's device, as a stand-alone software package, partly on the user's computing device and partly on a remote computing device, or entirely on the remote computing device or server. Where remote computing devices are involved, the remote computing devices may be connected to the user computing device over any kind of network, including a local area network (LAN) or wide area network (WAN), or may be connected to an external computing device (e.g., by using an Internet service provider business via an Internet connection).

The purpose of the present disclosure is to provide an image description generation method, an image description generation apparatus, an image description generation system, a computer-readable storage medium, and an electronic device, so as to at least to a certain extent overcome the problem of low accuracy of image description due to the limitations and defects of the related art.

In the image description generation method provided by embodiments of the present disclosure, on the one hand, by acquiring one or more image region features in a target image, and obtaining a current input vector by performing a mean pooling on the image region features; obtaining respective outer product vectors of the image region features by respectively linearly fusing the current input vector and each of the image region features; calculating, based on the respective outer product vectors of the image region features, an attention distribution of the image region features in a spatial dimension and an attention distribution of the image region features in a channel dimension; and finally generating an image description of the target image based on the attention distribution of the image region features in the spatial dimension and the attention distribution of the image region features in the channel dimension, the following problems are solved, in the prior art, the traditional attention module usually uses linear fusion to perform cross-modal feature interaction learning, which essentially only excavates the first-order feature interaction between different modalities, so the accuracy of the generated image description is low. Furthermore, by using the image description generation method provided by embodiments of the present disclosure, the accuracy of the generated image description is improved. On the other hand, the image description of the target image is generated according to the attention distribution in the spatial dimension and the attention distribution in the channel dimension, which realizes the generation of the image description of the target image according to the attention distribution in two dimensions.

In addition, the above-mentioned figures are merely schematic illustrations of the processes included in the methods according to the embodiments of the present disclosure, and are not intended to be limiting. It is easy to understand that the processes shown in the above figures do not indicate or limit the chronological order of these processes. In addition, it is also readily understood that these processes may be performed synchronously or asynchronously, for example, in multiple modules.

Those skilled in the art will easily think of other embodiments of the present disclosure after considering the specification and practicing the invention disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are to be regarded as exemplary only, and the true scope and spirit of the present disclosure are pointed out by the following claims.

What is claimed is:

1. An image description generation method, comprising:
   acquiring one or more image region features in a target image, and obtaining a current input vector by performing a mean pooling on the image region features;
   obtaining respective outer product vectors of the image region features by respectively linearly fusing the current input vector and each of the image region features;
   calculating, based on the respective outer product vectors of the image region features, an attention distribution of the image region features in a spatial dimension and an attention distribution of the image region features in a channel dimension; and
   generating an image description of the target image based on the attention distribution of the image region features in the spatial dimension and the attention distribution of the image region features in the channel dimension.

2. The method according to claim 1, wherein the acquiring image region features in the target image comprises:
   obtaining at least one object included in the target image by detecting the target image; and
   obtaining the image region features corresponding to each object included in the target image.

3. The method according to claim 1, wherein the calculating, based on the respective outer product vectors of the image region features, the attention distribution of the image region features in the spatial dimension and the attention distribution of the image region features in the channel dimension comprises:
   obtaining the attention distribution of the image region features in the spatial dimension by mapping the respective outer product vectors of the image region features; and
   obtaining the attention distribution of the image region features in the channel dimension by performing a squeeze-excitation processing on the respective outer product vectors of the image region features.

4. The method according to claim 3, wherein the obtaining the attention distribution of the image region features in the spatial dimension by mapping the respective outer product vectors of the image region features comprises:
   obtaining an attention weight corresponding to each image region by mapping each of the outer product vectors of the image region features; and
   obtaining the attention distribution of the image region features in the spatial dimension by normalizing the attention weight corresponding to each image region.

5. The method according to claim 3, wherein the obtaining the attention distribution of the image region features in the channel dimension by performing the squeeze-excitation processing on the respective outer product vectors of the image region features comprises:
   obtaining a squeezed channel expression by fusing each of the outer product vectors of the image region features in the spatial dimension;
   obtaining the attention weight of the image region features in the channel dimension by performing an excitation processing on the squeezed channel expression; and
   obtaining the attention distribution of the image region features in the channel dimension by performing a regularization processing on the attention weight of the image region features in each channel dimension.

6. The method according to claim 1, wherein the generating an image description of the target image based on the attention distribution in the spatial dimension and the attention distribution in the channel dimension comprises:
   obtaining respective current aggregated features by fusing, based on the attention distribution of the image region features in the spatial dimension, the image region features and the respective outer product vectors of the image region features;
   obtaining a target aggregated feature by fusing the respective current aggregated features based on the attention distribution of the image region features in the channel dimension; and
   generating the image description of the target image based on the target aggregated feature.

7. The method according to claim 1, wherein the obtaining respective outer product vectors of the image region features by linearly fusing the current input vector and the image region features comprises:
   obtaining the respective outer product vectors of the image region features by respectively performing an exponential mapping on the current input vector and each of the image region features, and performing a linear fusion on the exponential mapped current input vector and the exponential mapped image region feature.

8. The method according to claim 1, wherein the respective outer product vectors of the image region features comprises second-order feature interactive information between a current hidden state feature of a decoder and an encoded image region feature.

9. An image description generation system implementing the image description generation method according to claim 1, comprising:
   an object detection module configured to acquire one or more image region features in a target image;
   an encoder connected to the object detection module via a network, and comprising a plurality of high-order attention modules;
   a decoder connected with the encoder via the network and comprising a plurality of long and short-term memory networks with a high-order attention mechanism;

wherein the plurality of high-level attention modules are configured to:
acquire the one or more image region features in the target image, and obtain a current input vector by performing a mean pooling on the image region features;
obtain respective outer product vectors of the image region features by respectively linearly fusing the current input vector and each of the image region features;
calculate, based on the respective outer product vectors of the image region features, an attention distribution of the image region features in a spatial dimension and an attention distribution of the image region features in a channel dimension; and
generate an image description of the target image based on the attention distribution of the image region features in the spatial dimension and the attention distribution of the image region features in the channel dimension.

10. A non-transitory computer-readable storage medium on which a computer program is stored, wherein when the computer program is executed by a processor, an image description generation method is implemented,
wherein the image description generation method comprises:
acquiring one or more image region features in a target image, and obtaining a current input vector by performing a mean pooling on the image region features;
obtaining respective outer product vectors of the image region features by respectively linearly fusing the current input vector and each of the image region features;
calculating, based on the respective outer product vectors of the image region features, an attention distribution of the image region features in a spatial dimension and an attention distribution of the image region features in a channel dimension; and
generating an image description of the target image based on the attention distribution of the image region features in the spatial dimension and the attention distribution of the image region features in the channel dimension.

11. An electronic device, comprising:
a processor; and
memory for storing instructions executed by the processor;
wherein, the processor is configured to:
acquire one or more image region features in a target image, and obtain a current input vector by performing a mean pooling on the image region features;
obtain respective outer product vectors of the image region features by respectively linearly fusing the current input vector and each of the image region features;
calculate, based on the respective outer product vectors of the image region features, an attention distribution of the image region features in a spatial dimension and an attention distribution of the image region features in a channel dimension; and
generate an image description of the target image based on the attention distribution of the image region features in the spatial dimension and the attention distribution of the image region features in the channel dimension.

12. The electronic device according to claim 11, wherein the processor is configured to:
obtain at least one object included in the target image by detecting the target image; and
obtain the image region features corresponding to each object included in the target image.

13. The electronic device according to claim 11, wherein the processor is configured to:
obtain the attention distribution of the image region features in the spatial dimension by mapping the respective outer product vectors of the image region features; and
obtain the attention distribution of the image region features in the channel dimension by performing a squeeze-excitation processing on the respective outer product vectors of the image region features.

14. The electronic device according to claim 13, wherein the processor is configured to:
obtain an attention weight corresponding to each image region by mapping each of the outer product vectors of the image region features; and
obtain the attention distribution of the image region features in the spatial dimension by normalizing the attention weight corresponding to each image region.

15. The electronic device according to claim 13, wherein the processor is configured to:
obtain a squeezed channel expression by fusing each of the outer product vectors of the image region features in the spatial dimension;
obtain the attention weight of the image region features in the channel dimension by performing an excitation processing on the squeezed channel expression; and
obtain the attention distribution of the image region features in the channel dimension by performing a regularization processing on the attention weight of the image region features in each channel dimension.

16. The electronic device according to claim 11, wherein the processor is configured to:
obtain respective current aggregated features by fusing, based on the attention distribution of the image region features in the spatial dimension, the image region features and the respective outer product vectors of the image region features;
obtain a target aggregated feature by fusing the respective current aggregated features based on the attention distribution of the image region features in the channel dimension; and
generate the image description of the target image based on the target aggregated feature.

17. The electronic device according to claim 11, wherein the processor is configured to:
obtain the respective outer product vectors of the image region features by respectively performing an exponential mapping on the current input vector and each of the image region features, and performing a linear fusion on the exponential mapped current input vector and the exponential mapped image region feature.

18. The electronic device according to claim 11, wherein the respective outer product vectors of the image region features comprises second-order feature interactive information between a current hidden state feature of a decoder and an encoded image region feature.

* * * * *